United States Patent [19]

Padrin

[11] Patent Number: 5,555,755
[45] Date of Patent: Sep. 17, 1996

[54] CONCEALED MECHANICAL ANTITHEFT DEVICE ON A MOTOR VEHICLE GEAR LEVER

[75] Inventor: Giovanni Padrin, Via Curtatone, Italy

[73] Assignee: M.M.T. Di Padrin Mario & C. S.N.C., Gallarate, Italy

[21] Appl. No.: 287,227

[22] Filed: Aug. 8, 1994

[30] Foreign Application Priority Data

Sep. 7, 1993 [IT] Italy .................. MI93A1918

[51] Int. Cl.⁶ .................................................. B60R 25/06
[52] U.S. Cl. ................................................ 70/247; 70/202
[58] Field of Search ............................. 70/237, 245–248, 70/198–203, 251, 254, 192–197; 180/287; 292/140

[56] References Cited

U.S. PATENT DOCUMENTS

| | | |
|---|---|---|
| 748,202 | 12/1903 | Mills .................... 292/140 X |
| 1,362,685 | 12/1920 | Farah ..................... 70/201 |
| 1,376,085 | 4/1921 | Epps ...................... 70/245 |
| 1,635,080 | 7/1927 | Gilpin et al. ............ 70/185 |
| 1,895,404 | 1/1933 | Tretbar ................... 70/201 |
| 2,471,293 | 5/1949 | Truesdell ................. 70/202 |
| 4,936,120 | 6/1990 | Fiks .................... 70/247 X |
| 5,251,466 | 10/1993 | Chang ..................... 70/247 |
| 5,372,019 | 12/1994 | Hsiao ................... 70/209 X |

FOREIGN PATENT DOCUMENTS

| | | | |
|---|---|---|---|
| 6421 | 12/1927 | Austria ..................... 70/202 |
| 1388314 | 12/1964 | France ...................... 70/247 |
| 23319 | 8/1913 | United Kingdom ............. 292/140 |
| 2129479 | 5/1984 | United Kingdom ............. 292/140 |
| 2152454 | 8/1985 | United Kingdom ............. 70/247 |
| WO94/04397 | 3/1994 | WIPO . | |

Primary Examiner—Lloyd A. Gall
Attorney, Agent, or Firm—Steinberg, Raskin & Davidson, P.C.

[57] ABSTRACT

An antitheft device acting on a motor vehicle gear lever including a slider movable relative to support members and arranged to cooperate with the gear lever. The slider having a counteracting member which is brought into contact with the gear lever so as to prevent its movement when the antitheft device is engaged and consequently to prevent the use of the vehicle. The support members and the relative movable slider being arranged in a concealed position within a gearshift protection part positioned in the vehicle passenger compartment and from which the gear lever projects. The slider is a plate element with a recessed end arranged to lock the gear lever in a plurality of positions corresponding to different gears. The slider has a polygonal containing an actuator device which is defined by an elongate element torsionally constrained to the lock.

17 Claims, 3 Drawing Sheets

CONCEALED MECHANICAL ANTITHEFT DEVICE ON A MOTOR VEHICLE GEAR LEVER

FIELD OF THE INVENTION

This invention relates to an antitheft device acting on a motor vehicle gear lever which projects from a conventional gearshift protection part provided in the vehicle passenger compartment.

BACKGROUND OF THE INVENTION

Various antitheft devices of the aforesaid type are known. In general, these devices comprise gearshift locking members which both when in their utilization position (antitheft device engaged) and when in their rest position (antitheft device disengaged) are visible within the passenger compartment, to the detriment of its appearance. Other known antitheft devices comprise removable bars which are fixed to the handbrake lever and cooperate with the gear lever to prevent its use.

These devices are generally laborious to mount and often laborious to use.

Other antitheft devices of the aforesaid type are known which are incorporated in a concealed manner within the gearshift protection part.

One of these devices is described in BE-A-898020; this document describes an antitheft device to be mounted to the side of the gear lever and comprising a part fixed to the frame and a part movable relative to this latter to come into contact with the gear lever to lock it in a working position (with a gear engaged). The fixed part acts as a guide for the movable part or member, which is acted upon by a lever mechanism operated by a key. The lever mechanism carries at its end a pin movable within a guide provided transversely within the movable member, said lever mechanism being positioned parallel to said member when not cooperating with the gear lever, and having its longitudinal axis inclined (by an angle less than 90°) to the longitudinal axis of said member when this latter cooperates with said gear lever to lock it.

The movable member is also provided at a rounded end with a seat in which the gear lever can sit when locked. This member is subjected to the action of a compression spring which tends to hold it still when cooperating with said gear lever, so locking it, and which opposes its release movement with a force exceeding that which can be exerted by the key. In this manner, said release is only possible by moving the movable member (by means of the key acting on the lever mechanism) and the gear lever simultaneously.

This known device has various drawbacks. Firstly, as it is positioned to the side of the gear lever it occupies a considerable space within the gearshift protection part. This prevents its use on automobiles in which this protection part is of small dimensions and where there is no space for positioning anything to the side of the gear lever.

In addition, the seat provided in the movable member is such as to enable the gear lever to be locked only when in certain particular positions (for example corresponding to first or third gear or possibly only reverse). Consequently for advantageous and reliable use of the antitheft device, the vehicle on which it is mounted has to be parked only in particular positions so that its unauthorized use can be prevented. For example, if the antitheft device is able to lock the gear lever when in the reverse gear position, for the vehicle not to be able to be moved it has to be parked with its rear end facing an obstacle (such as a wall).

Hence this Belgian device is hardly practical.

In addition, because the lever mechanism which moves the movable member is inclined to the axis of said member when this latter cooperates with the gear lever, by acting forcibly on the gear lever it is possible to move said member and release the gear lever. In this manner, if the gear lever is locked for example in the position corresponding to first gear, it can be released and shifted into neutral to enable the vehicle to be moved (for example removed from the obstacle in front of which it was parked). The gear lever can then be shifted into the position corresponding to first gear and the vehicle can be driven away.

In addition, this device is of considerable size and complicated construction. Finally, it is complicated to release the antitheft device, requiring manipulation both of the gear lever and of the key used to operate the lever mechanism which moves the movable member. This manipulation of the gear lever can lead with time to breakage of the pin by which movement is transmitted from the lever mechanism to the movable member.

Another device of the stated type is presented in WO-A-8804246, which describes an antitheft device acting on the gear lever and comprising two movable elements which close together about the gear lever, to lock it. This device has only one gear lever locking position, so limiting its reliable use. In addition, this device is of relatively large dimensions so preventing its universal use on any type of vehicle. Moreover the device is of complicated construction.

OBJECTS AND SUMMARY OF THE INVENTION

An object of the invention is to provide an antitheft device acting on the gear lever which overcomes the drawbacks of known devices.

A particular object of the present invention is to provide an antitheft device which is simple to mount on the vehicle, is easy to use and occupies a very small space within the gearshift protection part, hence allowing it to be used on any type of vehicle.

A further object is to provide an antitheft device of the aforesaid type, of which both the time and cost of its construction and mounting are very low and which offers considerable reliability in use.

A further object is to provide an antitheft device of the aforesaid type, the mounting of which does not require mechanical work on the gearbox or on the members connected to it.

These and further objects which will be apparent to the expert of the art are attained by an antitheft device in accordance with the characteristics both of the independent claim and of those associated therewith.

BRIEF DESCRIPTION OF THE DRAWINGS

The present invention will be more apparent from the accompanying drawing, which is provided by way of non-limiting example and in which.

DETAILED DESCRIPTION OF THE PREFERRED EMBODIMENT

Figure 1:
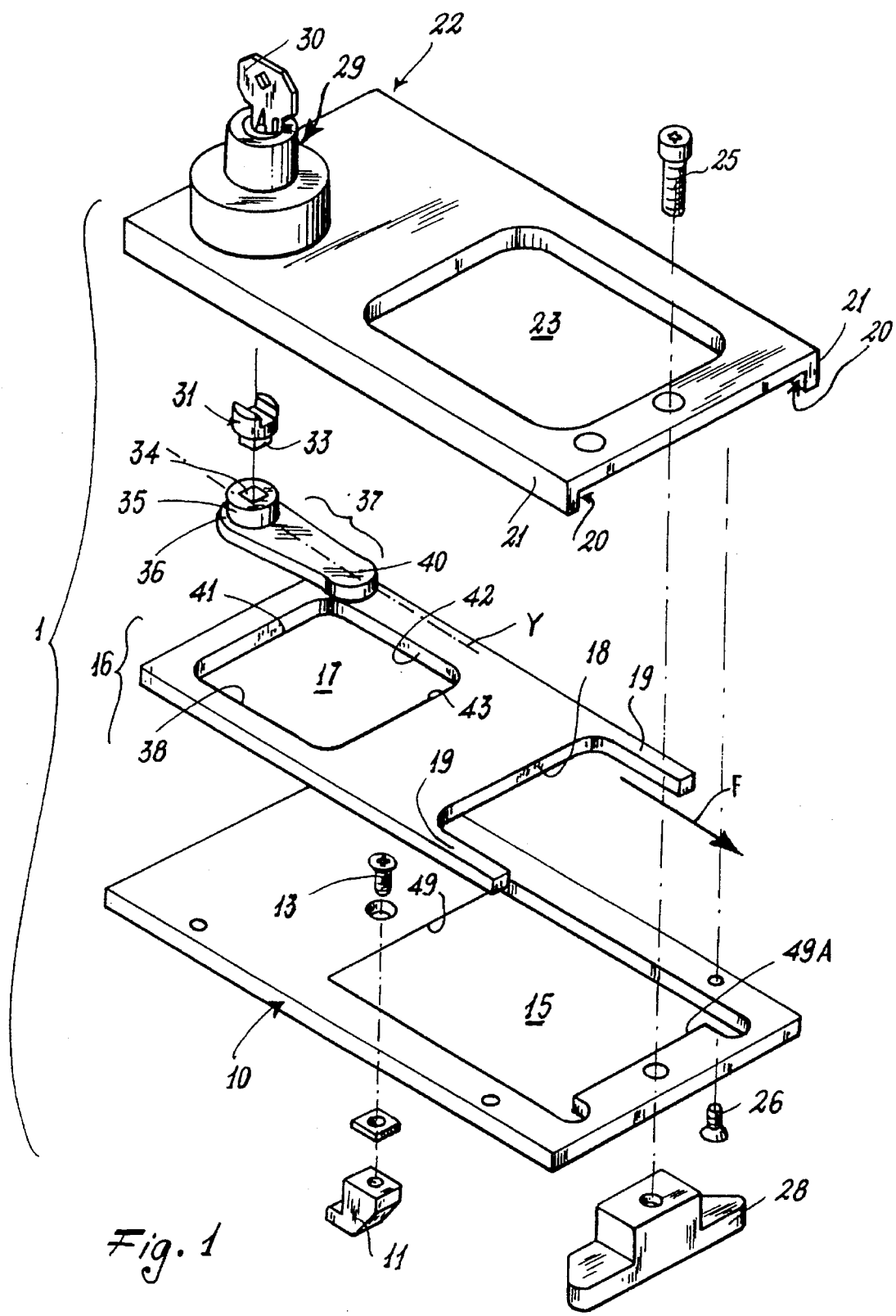
FIG. 1 is an exploded view of one embodiment of the antitheft device according to the invention.
Figure 2:
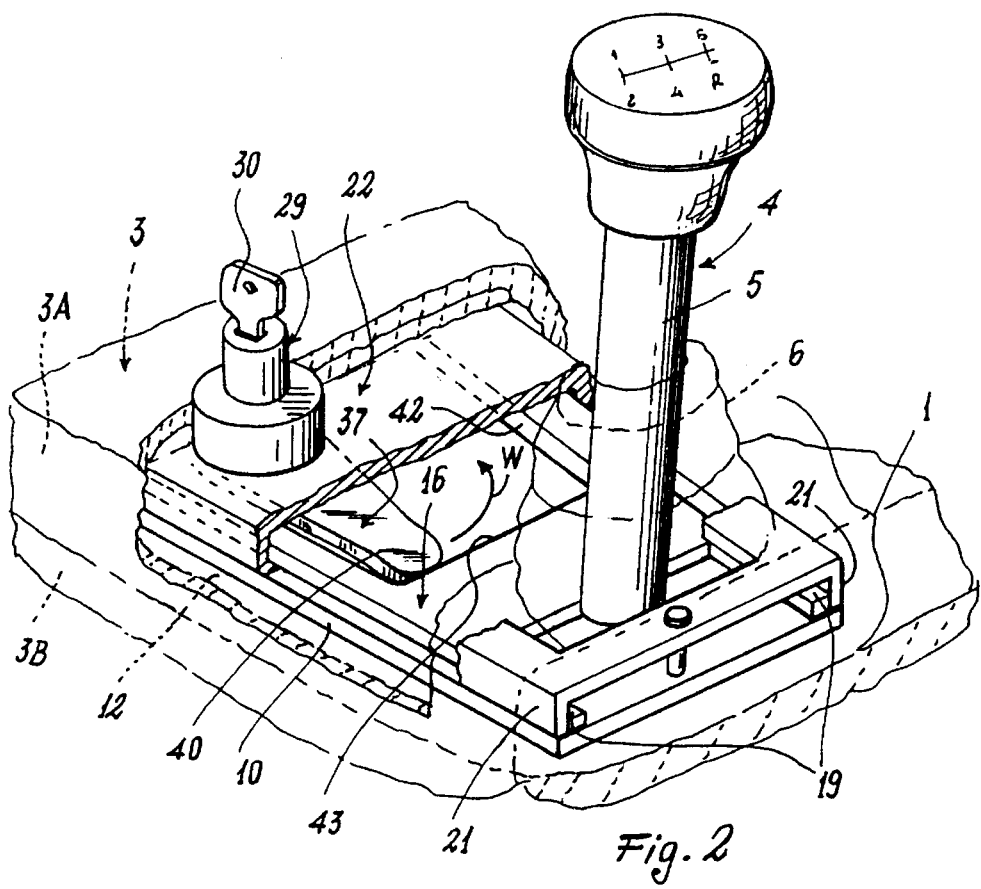
FIG. 2 is a perspective view of the antitheft device of FIG. 1 shown in its position of utilization, some parts being shown in section for greater clarity.

With reference to FIGS. 1 and 2, the antitheft device of the invention is indicated overall by 1. It is arranged to be positioned concealed within the usual gearshift protection part 3 of the vehicle present in its passenger compartment (wherever this part is positioned within the vehicle, i.e. on its floor or on its steering wheel). The antitheft device is arranged to cooperate with a usual gear lever 4 comprising an operating shaft 5 projecting from the part 3 and partially covered by a protection bellows 6.

The antitheft device 1 comprises a base part or plate 10 connected (by a screw 13) to a substantially hook-shaped element 11 for its initial removable fixing within a compartment 12 of the part 3. The hook-shaped element hooks to a conventional bracket (not shown) present in the compartment 12.

The plate 10 also comprises a substantially square hole 15.

An element or slider 16 comprising a (substantially square) through hole 17 and an end 18 with a large recess bounded by lateral projections 19 is movable on the plate 10. The slider 16 slides within guides 20 defined by the plate 10 and by sides 21 of an upper closure or plate element 22 also provided with a through hole 23. The element 22 is connected to the (lower) plate 10 by screws 25 and 26, the screw 25 cooperating with a block 28 fixedly inserted into the compartment 12 in any known manner.

With the plate 22 there is associated a conventional lock 29 operated by a key 30, the lock being preferably of known anti-tamper type.

With the lock 29 there is associated an element 31 (which alternatively can be a part of said lock) comprising a polygonal protuberance 33 arranged to cooperate with a corresponding seat 34 in a bush 35 positioned at the end 36 of an elongate element (or lever) 37 located in proximity to (and preferably in contact with) a side 38 bounding the hole 17 in the slider 16 and within this latter. The lever 37 has a thickness equal to the depth of the hole 17 (and consequently projects neither above nor below it) and is able to move within the hole, but always remaining adjacent to the side 38. The lever 37 has a rounded free end 40 which cooperates with two (41 and 43) of the remaining sides 41, 42 and 43 defining the hole 17, to move it between the plates 10 and 22.

Finally, the holes 15 and 23 are arranged superposed to receive the shaft 5 of the gear lever 4, the holes being sufficiently large to allow normal movement of the gear lever during vehicle driving.

It will be assumed that the aforedescribed antitheft device is to be used.

During vehicle movement the gear lever 4 can move freely within the superposed holes 15 and 23. In this situation the end 18 of the slider 16 is maintained in correspondence with a side 49 (FIG. 1) of the hole 15 so as to allow movement of the gear lever 4. At the same time the lever 37 is positioned parallel to the side 38 of the hole 17 in the slider 16, with its end 40 facing the side 41 of the hole.

When the antitheft device is to be engaged, the gear lever 4 is moved into a suitable position (such as reverse—R—as indicated in FIG. 2). This position (reverse or a forward gear) is chosen in accordance with the position of any obstacle in front of which the vehicle is positioned. It should be noted that the large width of the end 18 enables the gear lever 4 to be positioned in any of the positions depending on the position of the vehicle with respect to the obstacle. In other words the gear lever 4 can be positioned at choice in reverse gear or in first, third or fifth gear (or in reverse gear or in second or fourth gear depending on the vehicle model) because of the fact that the gear lever can in all cases cooperate with the recess 18 which locks it (as described hereinafter).

The key 30 is then rotated to obtain corresponding movement (by the cooperation between the protuberance 33 of the element 31 and the bush 35) of the lever 37 within the hole 17. As a result of this movement, the lever end 40 is brought into cooperation with the side 43 of the hole 17 to hence urge the slider 16 to slide within the guide 20. The slider moves in the direction of the arrow F of FIG. 1 until its end 18 comes into contact with the gear lever 4 (preferably positioned, as stated, in a suitable manner on the basis of any obstacle in proximity to which the vehicle is parked). On reaching its end of travel, the lever 37 assumes the position shown in FIG. 2 and by pushing against the side 43 maintains the slider 16 bearing against the gear lever 4. At the same time it opposes and prevents any forced movement of the lever 4 (in the illustrated example, locked against the side 49A of the hole 15), so maintaining it in the stated reverse position R. It should be noted that this lever becomes positioned parallel to the direction of the movement undergone by the gear lever 4 in passing from first to second gear or from third to fourth gear. Consequently, no attempt to force the release of the device by pushing the lever against the slider 16 can produce any result, because the force acting on the lever 37 is parallel to its longitudinal axis Y. In addition, because of the manner in which the lock 29 is coupled to the lever 37, any thrust exerted on the slider 16 by the gear lever 4 in attempting to release the antitheft device is exerted in a direction passing through and perpendicular to the protuberance 33 (which lies on the axis Y) and hence cannot result in any rotation of the lock 29. In addition, because of the perpendicular arrangement and of the position of the lever 37 within the hole 17 in the slider 16, the lock 29 does not feel the thrust and is therefore not subjected to any possibility of breakage or damage.

In addition, even if it is sought to move the gear lever 4 laterally within the holes 15 and 23 and within the recessed end 18 in contact with the gear lever, no movement of the slider 16 can be achieved as it is locked in position (acting against the gear lever 4) by the lever 37.

To deactivate the antitheft device, the reverse of the aforesaid procedure is adopted by moving the lever 37 in the direction of the arrow W of FIG. 2 to hence separate the slider from the lever 4 (in a manner analogous to that described and by the action of the lever 37 on the side 41 bounding the hole 17 in this latter).

The antitheft device is of simple and reliable use. In addition it can be easily mounted in a concealed manner within the compartment 12 of the part 3 of any vehicle because the antitheft device is of small dimensions and contains the gear lever. This mounting is effected by separating the usual upper closure portion 3A of the part 3 from its lower portion 3B in any known manner. In addition, this mounting requires no work to be done on the gearbox members, and hence in no way disturbs its mechanical integrity.

Figure 3:
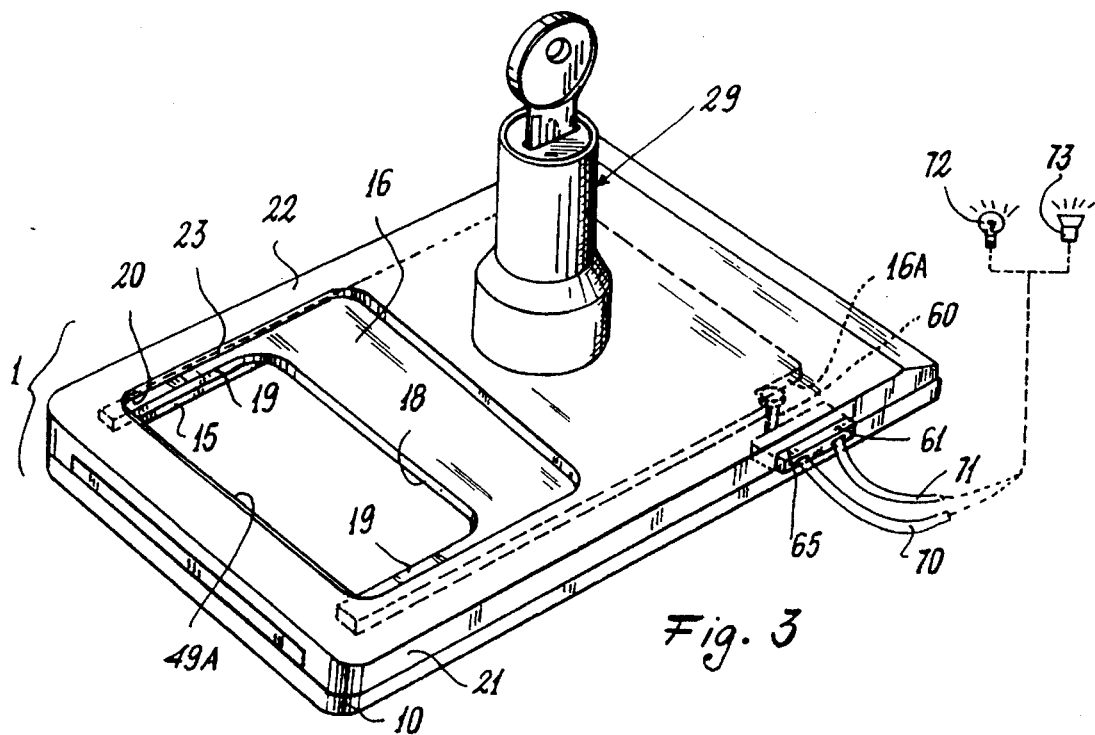
FIG. 3 is a perspective view of a modification of the antitheft device of FIG. 1.

FIG. 3 shows a modified embodiment of the invention. This figure (in which parts corresponding to those already described are indicated by the same reference numerals) shows a slider 16 provided laterally with a recess 16A arranged to cooperate with the mechanical contactor 60 of a microswitch 61 associated with the antitheft device 1 in known manner. The microswitch 61 is housed in a seat 65 provided in the side of the plate 22 and is connected by usual electrical connections 70 and 71 to the vehicle electrical supply and to an indicator lamp 72 indicating when the antitheft device is activated; the microswitch can also be connected to an acoustic indicator 73 (possibly connected to a usual tampering sensor, not shown) which is activated following unauthorized access to the vehicle. Even after unauthorized access to the vehicle, the antitheft device can be constructed to remain activated for a time exceeding a predetermined value (for example 30 seconds) i.e., the contactor 60 will not be retractable toward the microswitch 61 until the set time has elapsed.

On activating the antitheft device 1, the contactor 60 becomes positioned in the recess 16A and activates the indicator lamp 72 (LED) while setting the acoustic indicator 73 ready for activation. On deactivating the antitheft device 1, this contactor is urged by the slider towards the microswitch, which hence deactivates the indicators 72 and 73.

Figure 4:
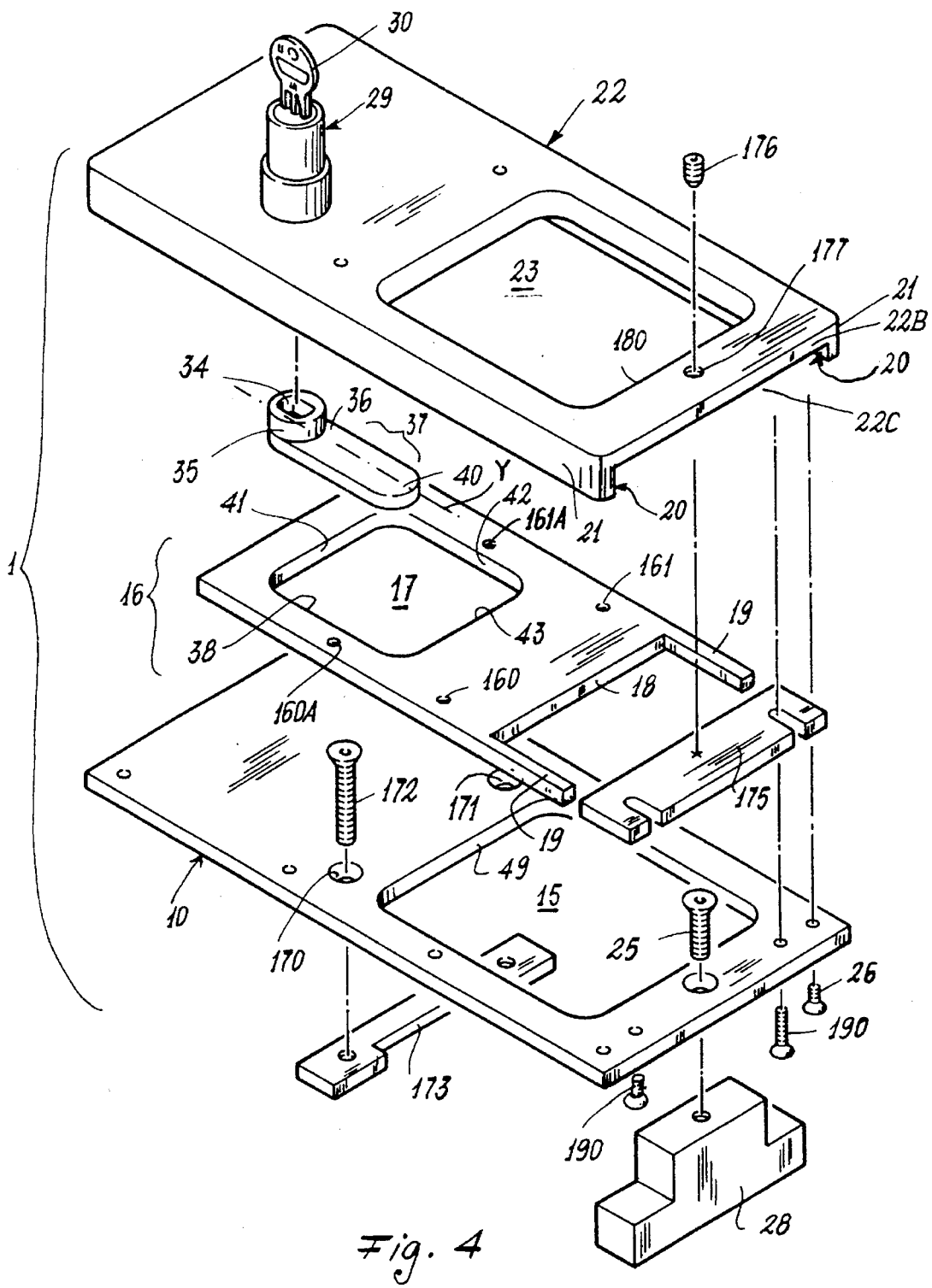
FIG. 4 is an exploded view of a further embodiment of the invention, and in which parts corresponding to those of the preceding figures are indicated by the same reference numerals.

FIG. 4 shows a further embodiment of the invention. In this embodiment, the slider 16 comprises through holes 160 and 161 which, when the antitheft device is disengaged (slider not cooperating with the gear lever), lie coaxial to holes 170 and 171 carrying screws 172 (only one is shown) for fixing the plate 10 to a bracket 173 inserted (for example fixed) into the compartment 12 of the gearshift protection part. The screw 25 is covered by a plate 175 kept in place by a usual socket head screw 176 (or the like) positioned in a hole 177 in the element 22. Hence with the antitheft device engaged, the screws 172 are inaccessible and the gear lever, maintained against an edge 180 of the element 22, prevents withdrawal of the plate 175 from the guides 20 via the hole 23 (in which the plate 175 is retained towards a free edge 22B of the element 20, where a cavity 22C is present, by screws 190 associated with the plate 10) in this element. Consequently with the antitheft device engaged it is not possible to remove it from the compartment 12 in the gearshift protection part. Preferably, the slider 16 comprises small balls 160A and 160B which become positioned in correspondence with the screws 172 when the antitheft device is engaged. This prevents access to the screws 172.

In contrast, with the antitheft device disengaged the screws 172 can be removed from the bracket 173, and by removing the socket head screw 176 the plate 175 can be withdrawn from the guides 20, to allow the screw 25 to be removed from the block 28. In this manner the antitheft device can be removed from the compartment 12, which is advantageous for working on the gearshift components contained in the part 3.

Various embodiments of the invention have been described. Other embodiments are possible in the light of the aforegoing description which is given by way of example only, these therefore falling within the scope of the present document. Embodiments applied to a manual gearbox have been described in which the slider 16 cooperates directly with the gear lever 4.

Alternatively, in automatic transmissions, this slider cooperates directly with a usual mechanical member operationally associated with the lever 4, said cooperation allowing indirect locking of said lever, making it impossible to use the vehicle. Such an embodiment also falls within the scope of the present invention.

I claim:

1. An antitheft device acting on a motor vehicle gear lever, said gear lever projecting from a gearshift protection part positioned in a vehicle passenger compartment, comprising movement means movable relative to support means and arranged to cooperate operationally with said gear lever, said movement means comprising counteracting means arranged to cooperate operationally with said gear lever to press said gear lever against said support means and prevent its movement when the antitheft device is engaged and consequently to prevent use of the vehicle, said support means and said movement means being positioned in a concealed manner within the gearshift protection part between a removable upper closure portion of said protection part and a lower part of said protection part, actuator means for causing movement of said movement means, a lock for controlling said actuator means, said movement means further comprising a plate-like element with one end acting as said counteracting means, said plate-like element comprising a polygonal hole, said actuator means comprising an elongate element contained within said hole and torsionally constrained at one of its ends to said lock, said elongate element being movable by said lock to a position in which said elongate element is, in a longitudinal direction, substantially parallel and adjacent to a side of said hole and a longitudinal axis of said elongate element is substantially parallel to the direction of movement of the gear lever when the antitheft device is engaged, said gear lever being contained within the antitheft device and being free to move therein when the antitheft device is deactivated.

2. An antitheft device as claimed in claim 1, wherein the plate-like element moves along guides defined between an upper element and an associated lower element, said upper and lower elements defining the support means for the movement means.

3. An antitheft device as claimed in claim 1, wherein the elongate element positioned within the hole in the movement means comprises a free end arranged to cooperate with at least two sides bounding said hole.

4. An antitheft device as claimed in claim 1, further comprising attachment means for attaching said support means to the protection part.

5. An antitheft device as claimed in claim 1, wherein the end of the plate-like element acting as said counteracting means operates directly on the gear lever and is of large width so as to cooperate with said gear lever in any one of a plurality of positions corresponding to the selection of different gears.

6. An antitheft device as claimed in claim 5, wherein the end of the plate-like element is recessed.

7. An antitheft device as claimed in claim 1, further comprising lamp indicator means for indicating activation of the antitheft device, said indicator means being controlled by a microswitch comprising a mechanical contactor cooperating with the movement means.

8. An antitheft device as claimed in claim 7, further comprising acoustic indicator means connected to the microswitch for operating in the case of unauthorized access to the vehicle on which the antitheft device is mounted.

9. An antitheft device acting on a motor vehicle gear lever, said gear lever projecting from a gearshift protection part positioned in a vehicle passenger compartment, comprising an elongate slidable plate slidable in a direction of movement of the gear lever and having a first end in pressing engagement with the gear lever when the antitheft device is activated to prevent movement of the gear lever in its movement direction, said plate including a hole, support means arranged in a concealed manner within the gearshift protection part for supporting said plate, actuator means at least partially arranged in said hole for selectively moving said plate to and from a position in which said first end is in pressing engagement with the gear lever, and locking means for locking said actuator means to prevent movement of said plate when the antitheft device is activated, said actuator means comprising an elongate element coupled at a first end to said locking means, said elongate element being movable by said locking means to a position in which a longitudinal axis of said elongate element is substantially parallel to the direction of movement of the gear lever when the antitheft device is activated, said elongate element having a second end opposite said first end which engages a first side of said hole to move said plate into pressing engagement with the gear lever.

10. The antitheft device of claim 9, wherein the gear lever includes a shaft, said shaft being operatively pressed by said first end of said plate against said support means.

11. The antitheft device of claim 9, wherein said support means comprise an upper plate and a lower plate, said slidable plate being supported between said upper plate and said lower plate, said upper plate and said lower plate each comprising a corresponding hole in which the gear lever is free for movement.

12. The antitheft device of claim 11 wherein said upper plate being elongate and comprising lateral guides arranged on opposite longitudinal sides of said upper plate, said slidable plate being movable along said guides.

13. The antitheft device of claim 11, wherein said first end of said slidable plate comprises a pair of lateral projections defining an elongate recess therebetween, said slidable plate being movable to press the gear lever in the elongate recess between said slidable plate and a portion of said lower plate, said upper plate and said lower plate being fixed to one another.

14. The antitheft device of claim 9 wherein said locking means comprise an element having a polygonal protuberance, said elongate element of said actuator means comprising a bush having a seat with a shape corresponding to the shape of said polygonal protuberance and engaging with said polygonal protuberance.

15. The antitheft device of claim 14, wherein said engaging protuberance and seat are positioned along the longitudinal axis of said elongate element.

16. The antitheft device of claim 9, wherein said hole in said slidable plate is square, said elongate element of said actuator means being situated proximate a side of said hole, said elongate element having a thickness corresponding to the thickness of said slidable plate.

17. The antitheft device of claim 9, wherein elongate element of said actuator means comprises a lever, said lever being movable upon unlocking of said locking means from a first activated position in which the longitudinal axis of said lever substantially corresponds to the direction of movement of the gear lever and said lever presses the first side of said hole to a second deactivated position in which said lever acts against a second opposed side of said hole causing said slidable plate to move away from the gear lever.

\* \* \* \* \*